Patented Dec. 11, 1951

2,577,778

UNITED STATES PATENT OFFICE 2,577,778

PREPARATION OF 4,6,8(9),11-PREG-NATETRAEN-3,20-DIONE

Robert H. Levin, George B. Spero, and John L. Thompson, Kalamazoo, Mich., assignors to The Upjohn Company, Kalamazoo, Mich., a corporation of Michigan No Drawing. Application September 9, 1950,
Serial No. 184,112

5 Claims. (Cl. 260—397.3)

The present invention relates to a novel composition of matter, the compound 4,6,8(9),11-pregnatetraen-3,20-dione, and to a process for the production thereof.

The compound of the present invention may be represented by the formula:

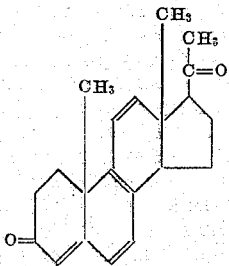

This compound is of high utility as a chemical intermediate in the synthesis of more complex organic molecules, including certain steroid hormones, and in addition is possessive of certain physiological activity, including high progestational activity, per se, which makes the compound very desirable from the standpoint of the pharmaceutical industry.

The compound 4,6,8(9),11-pregnatetraen-3,20-dione is prepared by the removal of the adduct radical from a 9,11-oxido-5,7-pregnadien-3,20-dione adduct of the formula:

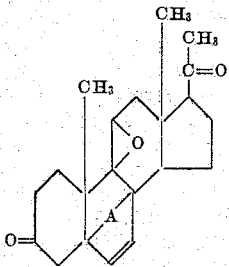

wherein A represents the adduct radical of maleic acid or maleic anhydride. The pyrolysis is accomplished by heating the 9,11-oxido-5,7-pregnadien-3,20-dione maleic acid or maleic anhydride adduct, preferably the anhydride adduct, with terpineol, preferably in solution in the terpineol, at a temperature between about 150 and 225 degrees centigrade, preferably between about 175 and 225 degrees centigrade, e. g., at the reflux temperature of the terpineol. If desired, a small amount of hydroquinone may be added to the reaction mixture as an antioxidant, but such addition is not necessary. At the end of a suitable period, e. g., two to six hours, depending to some extent on the temperature at which the reaction is conducted, the reaction is complete and the reaction mixture may be cooled, steam-distilled to remove the terpineol, and the water layer extracted with ether. Working up of the ether extract according to conventional procedure, as more fully described in the example, is productive of crystals of the desired 4,6,8(9),11-pregnatetraen-3,20-dione.

The starting 9,11-oxido-5,7-pregnadien-3,20-dione maleic acid or maleic anhydride adducts are obtained by the chromic acid oxidation of the corresponding 3-hydroxy-9,11-oxido-5,7-pregnadien-20-one adduct. Alternatively, the maleic acid adduct can be obtained by mild saponification of the 9,11-oxido-5,7-pregnadien-3,20-dione maleic anhydride adduct.

The 3-hydroxy-9,11-oxido-5,7-pregnadien-20-one maleic acid and maleic anhydride adducts are obtained by the epoxidation of the 9,11 double bond of the corresponding 3-hydroxy-5,7,9(11)-pregnatrien-20-one adduct, using an organic peracid or hydrogen peroxide. Alternatively, a 3-acyloxy-5,7,9(11)-pregnatrien-20-one adduct may be epoxidized in this manner, and the 3-hydroxy maleic acid adduct thereof obtained by saponification of the 3-acyloxy compound with a base. The diacid may be converted to the anhydride by heating in a vacuum.

The 3-hydroxy-5,7,9(11)-pregnatrien-20-one maleic acid adduct is produced by saponification of a 3-acyloxy-5,7,9(11)-pregnatrien-20-one maleic anhydride adduct, and may be converted to the 3-hydroxy-5,7,9(11)-pregnatrien-20-one maleic anhydride adduct by heating in a vacuum.

The maleic anhydride adduct of a 3-acyloxy-5,7,9(11)-pregnatrien-20-one can be prepared by ozonization of an adduct of a 22-enol ester of a 3-acyloxy-5,7,9(11)-cholatrien-22-al.

The maleic anhydride adduct of a 22-enol ester of a 3-acyloxybisnor-5,7,9(11)-cholatrien-22-al can be prepared from the corresponding aldehyde adduct by heating with an acid anhydride in the presence of an alkaline salt of the acid.

The maleic anhydride adduct of a 3-acyloxy- 5,7,9(11)-bisnor cholatrien-22-al can be prepared by ozonization of known maleic acid and maleic anhydride adducts of dehydroergosterol esters [Honigmann, Ann. 508, 89 (1934) (referred to in Fieser and Fieser, "Chemistry of Natural Products Related to Phenanthrene," Reinhold Publishing Co., New York (1936), at pp. 175-176)].

The following example and preparations are given by way of illustration only and are not to be construed as limiting.

*Preparation 1.—Maleic anhydride adduct of 3-beta-acetoxybisnor-5,7,9(11)-cholatrien-22-al*

A two-liter round-bottom flask was charged with fifty grams (0.93 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89-95 percent of the desired aldehyde.

*Preparation 2.—Maleic anhydride adduct of 3-beta - acetoxy - 22 - acetoxybisnor - 5,7,9(11),-20(22)-cholatetraen*

A mixture of twenty grams of the maleic anhydride adduct of 3-beta-acetoxybisnor-5,7,9-(11)-cholatrien-22-al, six grams of anhydrous sodium acetate, and 600 milliliters of acetic anhydride was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy - 22 - acetoxybisnor - 5,7,9(11),20(22) - cholatetraen, which melted at 186 to 193 degrees centigrade. Recrystallization of the crude product from a mixture of acetone and pentane raised the melting point to 200.5 to 202 degrees centigrade.

*Preparation 3.—Maleic anhydride adduct of 3-beta-acetoxy-5,7,9(11)-pregnatrien-20-one*

A solution of 50.8 grams of the maleic anhydride adduct of 3-beta-acetoxybisnor-5,7,9(11)-cholatrien-22-al enol acetate (from Preparation 2) in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

*Preparation 4.—Maleic anhydride adduct of 3-beta-acetoxy-9,11-oxido-5,7-pregnadien-20-one*

A solution of fifty grams of the maleic anhydride adduct of 3-beta-acetoxy-5,7,9(11)-pregnatrien-20-one in 1200 milliliters of glacial acetic acid was prepared by heating the ingredients together on a steam bath. The mixture was then cooled to below forty degrees centigrade and fifty milliliters of thirty percent hydrogen peroxide in 300 milliliters of glacial acetic acid added thereto. The mixture was heated on the steam bath for one hour at a temperature of 85 degrees centigrade or above, and was then poured into three to five volumes of ice and water. The yield was 47.7 grams (92 percent), melting point 238-243 degrees centigrade, $[alpha]_D^{25} + 31.1$ degrees (in chloroform). The product was dissolved in methylene chloride and precipitated by addition of ether to give 37.7 grams of purified product having a melting point of 254 to 259 degrees centigrade, $[alpha]_D^{25} + 33.2$ degrees (in chloroform).

*Preparation 5.—Maleic acid adduct of 3-beta-hydroxy-9,11-oxido-5,7-pregnadien-20-one*

Approximately 445 milliliters of five percent sodium hydroxide solution was added to 22.26 grams of 3-beta-acetoxy-9,11-oxido-5,7-pregnadien-20-one maleic anhydride adduct in a one-liter Erlenmeyer flask and the mixture stirred until the solid had gone into solution. About 185 milliliters of ten percent hydrochloric acid was then added at room temperature or below, until the mixture was acid to Congo red paper, whereupon the hydroxy diacid began to precipitate. Upon cooling the flask overnight, filtering, and air-drying the product at room temperature, a yield of 19.4 grams of desired 3-beta-hydroxy-9,11-oxido-5,7-pregnadien-20-one maleic acid adduct, melting at 229-233 degrees centigrade with decomposition, was obtained. An additional crop of crystals was obtained by concentration of the mother liquor.

*Preparation 6.—Maleic anhydride adduct of 3-beta-hydroxy-9,11-oxido-5,7-pregnadien-20-one*

3-beta-hydroxy-9,11-oxido-5,7-pregnadien-20-one maleic acid adduct (19.4 grams) was placed in a vacuum oven and heated for ten hours at 137–140 degrees centigrade under a pressure of only one-half millimeter of mercury. The yield of desired anhydride, which melts at 233 to 240 degrees centigrade with decomposition, was quantitative.

*Preparation 7.—Maleic acid adduct of 9,11-oxido-5,7-pregnadien-3,20-dione*

A solution of 0.20 gram of chromium trioxide in 0.1 milliliter of water and ten milliliters of acetic acid was added in portions over a period of one hour to a solution of 1.20 grams of the maleic acid adduct of 3-beta-hydroxy-9,11-oxido-5,7-pregnadien-20-one in 24 milliliters of glacial acetic acid at room temperature. The solution, upon standing for 45 minutes, became completely green, and was diluted with water and then concentrated in vacuo to a heavy syrup. This was mixed with 100 milliliters of aqueous sodium chloride containing three milliliters of three normal hydrochloric acid. A light-green, gummy precipitate formed upon cooling for 24 hours. This was separated by filtration, and the filtrate allowed to stand another 24 hours in the refrigerator, giving 0.42 grams of white crystals melting at 262–270 degrees centigrade. The crystalline precipitate was dissolved in fifteen milliliters of one percent aqueous sodium hydroxide and made acid with 1.5 milliliters of three normal hydrochloric acid to give a clear solution which, upon standing, deposited an almost quantitative yield of crystals melting at 268–272 degrees centigrade.

Analysis:

|  | Percent C | Percent H |
|---|---|---|
| Calculated for $C_{23}H_{30}O_7$ | 67.86 | 6.83 |
| Found | 67.71 | 6.71 |

*Preparation 8.—Maleic anhydride adduct of 9,11-oxido-5,7-pregnadien-3,20-dione*

A solution of 2.6 grams of chromium trioxide in 2.5 milliliters of water, 45 milliliters of acetic acid, and 0.9 milliliter of sulfuric acid was added dropwise with stirring to a solution of sixteen grams of the maleic anhydride adduct of 3-beta-hydroxy-9,11-oxido-5,7-pregnadien-20-one in 120 milliliters of acetic acid in a one-liter Erlenmeyer flask fitted with a stirrer and dropping funnel. The dropwise addition required approximately thirty minutes, during which time the temperature of the reaction mixture was maintained between seventeen and nineteen degrees centigrade and the reaction mixture was constantly stirred. The cooling bath was then removed, the temperature of the mixture allowed to rise to room temperature, and the mixture stirred for an additional fifteen minutes at that temperature. Two milliliters of methanol was then added, followed by 600 milliliters of water, which was added slowly with stirring by means of a dropping funnel. The addition of water required about forty minutes, whereafter the flask was cooled and the product filtered and washed with water. The yield of desired maleic anhydride adduct of 9,11-oxido-5,7-pregnadien-3,20-dione was 12.34 grams (77 percent), having a melting point with decomposition of 248–256 degrees centigrade.

*Example.—4,6,8(9),11-pregnatetraen-3,20-dione*

The maleic anhydride adduct of 9,11-oxido-5,7-pregnadien-3,20-dione (15.47 grams) was refluxed for three hours in 310 milliliters of terpineol in the presence of 150 milligrams of hydroquinone. The solution was then cooled, steam-distilled to remove the terpineol, and the water layer extracted with two liters of ether in portions. The ether phase was washed with one liter of cold dilute (two percent) hydrochloric acid, one liter of cold dilute (one percent) sodium carbonate solution, water, and dried. The ether solution was concentrated to a syrup.

A portion (5.8 grams) of this syrup was dissolved in benzene and chromatographed on an alumina column. Elution of the column with isopropyl ether gave a fraction (4.008 grams) which yielded a semi-crystalline mass upon concentration. Recrystallization from ethyl acetate and then from isopropanol gave substantially pure 4,6,8(9),11-pregnatetraen-3,20-dione, melting at 147.5–148.5 degrees centigrade. This product has ultraviolet peaks at 371 and 301, with K values of 53.25 and 45.88 respectively. Infrared studies agree with the proposed structure.

Analysis:

|  | Percent C | Percent H |
|---|---|---|
| Calc'd for $C_{21}H_{24}O_2$ | 81.7 | 7.84 |
| Found | 81.67 | 7.83 |
|  | 81.76 | 7.80 |

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. The compound 4,6,8(9),11-pregnatetraen-3,20-dione, represented by the formula:

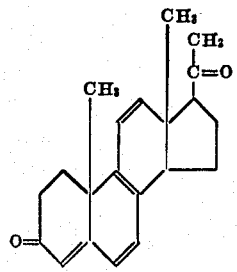

2. Process for the production of 4,6,8(9),11-pregnatetraen-3,20-dione which consists in heating a compound selected from the group consisting of 9,11-oxido-5,7-pregnadien-3,20-dione maleic anhydride adduct and 9,11-oxido-5,7-pregnadien-3,20-dione maleic acid adduct, together with terpineol, at a temperature of about 150 to 225 degrees centigrade, and separating from the reaction product 4,6,8(9),11-pregnatetraen-3,20-dione.

3. Process of claim 2, wherein the temperature is between about 175 and 225 degrees centigrade.

4. Process of claim 2, wherein the starting adduct is 9,11-oxido-5,7-pregnadien-3,20-dione maleic anhydride adduct.

5. Process of claim 2, wherein the reaction is conducted in the presence of a small amount of hydroquinone.

ROBERT H. LEVIN.
GEORGE B. SPERO.
JOHN L. THOMPSON.

No references cited.